United States Patent
Hinke et al.

(10) Patent No.: US 12,258,854 B2
(45) Date of Patent: Mar. 25, 2025

(54) BOTTOM HOLE ASSEMBLY MOUNTED SOLENOID FOR MAGNETIC RANGING

(71) Applicant: Halliburton Energy Services, Inc., Houston, TX (US)

(72) Inventors: Sean Hinke, Calgary (CA); Pete L. Schiermeier, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 84 days.

(21) Appl. No.: 17/727,165

(22) Filed: Apr. 22, 2022

(65) Prior Publication Data

US 2023/0079876 A1  Mar. 16, 2023

Related U.S. Application Data

(60) Provisional application No. 63/243,618, filed on Sep. 13, 2021.

(51) Int. Cl.
E21B 47/0228 (2012.01)
E21B 7/04 (2006.01)
G01D 5/14 (2006.01)

(52) U.S. Cl.
CPC ............ *E21B 47/0228* (2020.05); *E21B 7/04* (2013.01); *G01D 5/14* (2013.01)

(58) Field of Classification Search
CPC ......... E21B 47/0228; E21B 7/04; G01V 3/30; G01D 5/14
See application file for complete search history.

(56) References Cited

U.S. PATENT DOCUMENTS

| | | |
|---|---|---|
| 5,258,755 A | 11/1993 | Kuckes |
| 5,485,089 A | 1/1996 | Kuckes |
| 6,466,020 B2 | 10/2002 | Kuckes et al. |
| 6,626,252 B1 | 9/2003 | Kuckes |
| 6,736,222 B2 | 5/2004 | Kuckes et al. |
| 6,814,163 B2 | 11/2004 | Kuckes |
| 7,219,749 B2 | 5/2007 | Kuckes |

(Continued)

FOREIGN PATENT DOCUMENTS

| | | |
|---|---|---|
| CA | 2436056 | 9/2002 |
| CA | 2452120 | 5/2003 |

(Continued)

OTHER PUBLICATIONS

International Search Report and Written Opinion for Application No. PCT/US2022/027070, dated Aug. 17, 2022.

(Continued)

*Primary Examiner* — Caroline N Butcher
(74) *Attorney, Agent, or Firm* — Benjamin Ford; C. Tumey Law Group PLLC

(57) ABSTRACT

A method and system for ranging between two bottom hole assemblies (BHA). The method and system may include transmitting an electromagnetic field from a ranging device disposed on a first BHA, and measuring the electromagnetic field with a receiver disposed on a second BHA to form a measurement set. The method and system may further include an information handling system that may compare the measurement set to a decay rate of the electromagnetic field and identifying a distance between the ranging device and the receiver based at least in part on the decay rate.

16 Claims, 8 Drawing Sheets

(56) References Cited

U.S. PATENT DOCUMENTS

| | | | |
|---|---|---|---|
| 7,510,030 B2 | 3/2009 | Kuckes et al. | |
| 7,687,950 B2 | 3/2010 | Kuckes | |
| 8,113,298 B2 | 2/2012 | Kuckes | |
| 8,322,462 B2 | 12/2012 | Kuckes | |
| 8,749,243 B2 | 6/2014 | Bittar et al. | |
| 8,810,247 B2 | 8/2014 | Kuckes | |
| 10,208,584 B2 | 2/2019 | Wilson et al. | |
| 10,241,226 B2 | 3/2019 | Donderici et al. | |
| 10,294,773 B2 | 5/2019 | Donderici et al. | |
| 10,920,575 B2 | 2/2021 | Ahmadi | |
| 2006/0028321 A1 | 2/2006 | Kennedy et al. | |
| 2008/0041626 A1* | 2/2008 | Clark | G01V 3/26 340/854.6 |
| 2009/0308657 A1* | 12/2009 | Clark | E21B 47/0228 175/45 |
| 2010/0256913 A1 | 10/2010 | Kuckes | |
| 2011/0006773 A1* | 1/2011 | Bittar | E21B 47/0228 324/333 |
| 2011/0088890 A1* | 4/2011 | Clark | G01B 7/30 175/45 |
| 2015/0346381 A1 | 12/2015 | Donderici | |
| 2016/0160633 A1 | 6/2016 | Rodney | |
| 2017/0218750 A1 | 8/2017 | Pan et al. | |
| 2018/0112515 A1 | 4/2018 | Wu et al. | |
| 2018/0142548 A1 | 5/2018 | Donderici et al. | |
| 2019/0032472 A1 | 1/2019 | Ahmadi Kalateh Ahmad et al. | |
| 2020/0102818 A1 | 4/2020 | Ahmed et al. | |
| 2020/0224527 A1 | 7/2020 | Ahmadi Kalateh Ahmad et al. | |

FOREIGN PATENT DOCUMENTS

| | | |
|---|---|---|
| CA | 2747973 | 7/2010 |
| CA | 2765719 C | 10/2010 |
| EP | 1442320 B1 | 10/2006 |
| EP | 2414629 B1 | 2/2012 |
| EP | 3368743 | 5/2019 |
| WO | 2010114872 A1 | 4/2009 |
| WO | 2012009375 A1 | 1/2012 |

OTHER PUBLICATIONS

European Search Report for Application No. 22174459.2 received Nov. 16, 2022.

* cited by examiner

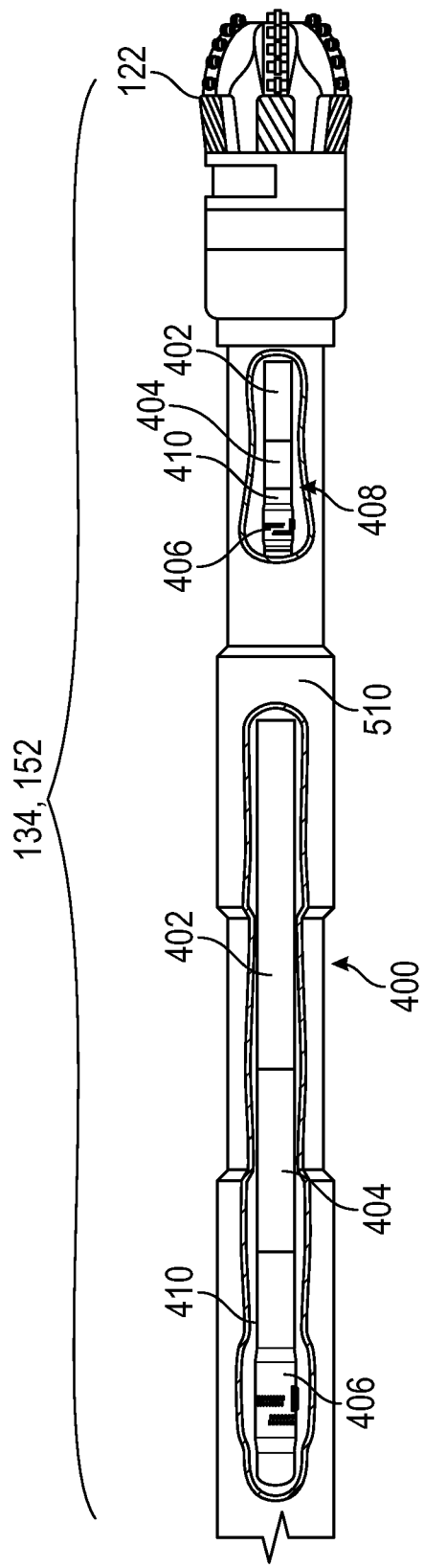
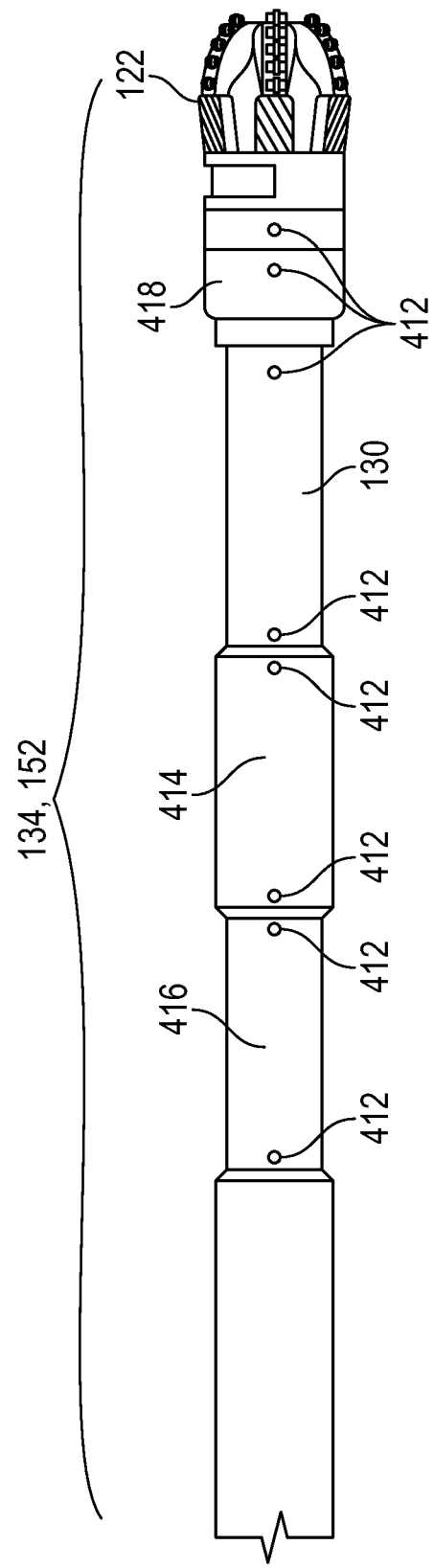
Figure 4A
Figure 4B

«BOTTOM HOLE ASSEMBLY MOUNTED SOLENOID FOR MAGNETIC RANGING»

BACKGROUND

Borehole drilled into subterranean formations may enable recovery of desirable fluids (e.g., hydrocarbons, hot water/steam) using any number of different techniques. When developing and drilling boreholes, it is important to be able to position the active borehole where desired proximate the surrounding geology of the subterranean formation and proximate adjacent boreholes. As drilling operations progress, the borehole position may change over time relative to adjacent boreholes.

Generally, a subterranean formation may have any number of boreholes drilled into it. Thus, during any given drilling operation, the drilling operation may have to locate previously drilled boreholes and/or boreholes being drilled concurrently.

Current technology requires deploying a source and/or receiver into an offset borehole to help in the identification of previously drilled wells or concurrent drilling operations. Specifically, a wireline operation is currently undertaken where a wireline source is deployed in offset boreholes and a source transmits from the wireline tool. As this incorporates two systems, wireline and logging-while-drilling (LWD), it is expensive and requires a large labor force.

BRIEF DESCRIPTION OF THE DRAWINGS

These drawings illustrate certain aspects of some examples of the present disclosure and should not be used to limit or define the disclosure.

FIG. 4A illustrates an example of a ranging device disposed on a bottom hole assembly;

FIG. 4B illustrates one or more receivers disposed on the bottom hole assembly;

DETAILED DESCRIPTION

Described below are methods and systems for drilling multiple wells in close proximity without the need for specific offset wells in which a transmitter device and/or receiver device are disposed for tracking drilling operations. While methods and systems described below may be applied to any form of drilling operation for hydrocarbon extraction, geothermal operation, water extraction, and/or any form of fluid extraction from a subterranean formation. Systems and methods may eliminate the need to deploy a wireline source and incorporates bottom hole assembly (BHA) mounted source and (BHA) mounted receiver in a target well and offset "drilling" well with the target well being an actively drilled well or a cased or open hole well.

Figure 1:
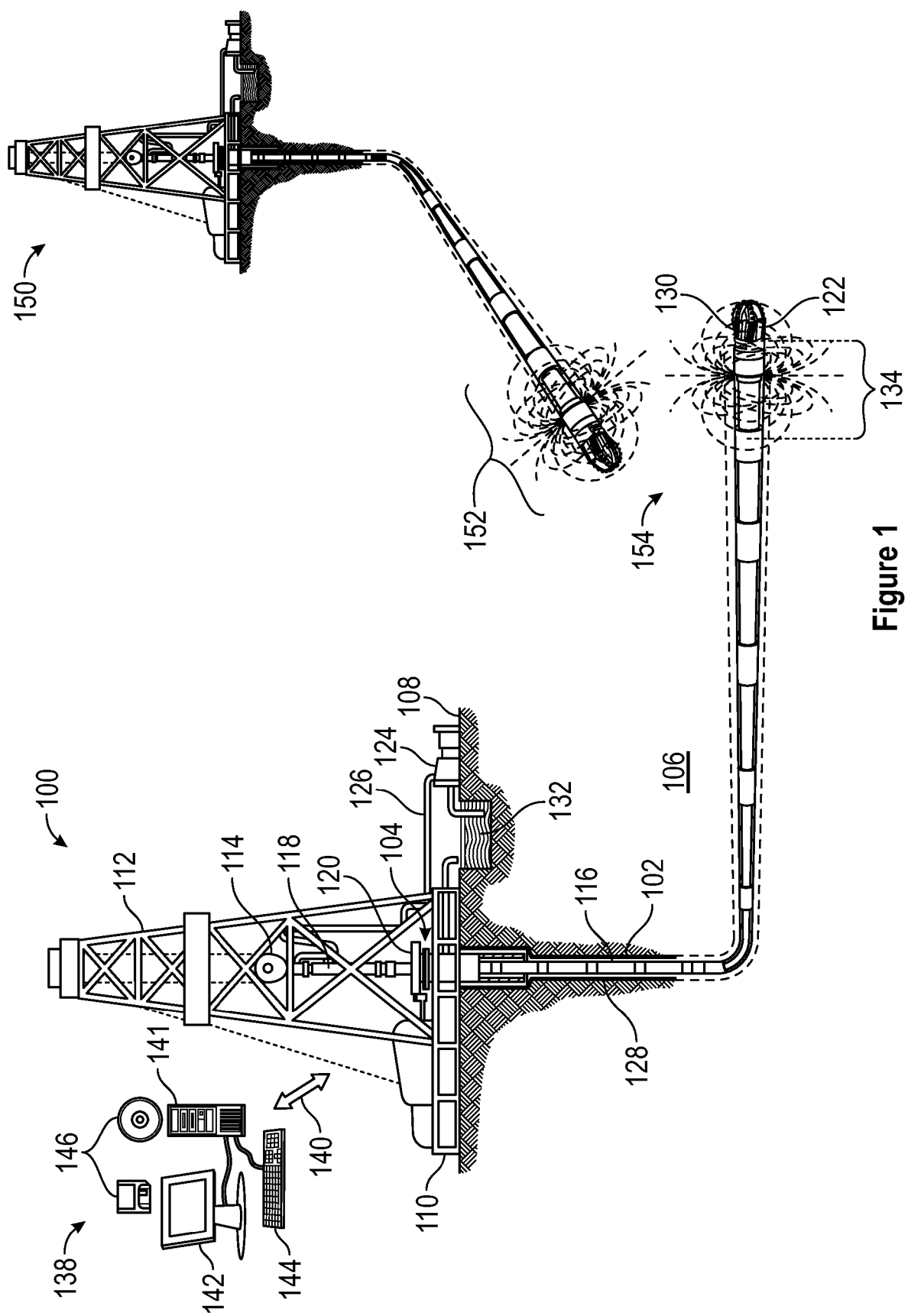
FIG. 1 illustrates an example of two drilling operations that are performing operations in the same area.

FIG. 1 illustrates a drilling operation 100 in accordance with example embodiments. As illustrated, borehole 102 may extend from a wellhead 104 into a subterranean formation 106 from a surface 108. Generally, borehole 102 may include horizontal, vertical, slanted, curved, and other types of borehole geometries and orientations. Borehole 102 may be cased or uncased. In examples, borehole 102 may include a metallic member. By way of example, the metallic member may be a casing, liner, tubing, or other elongated steel tubular disposed in borehole 102.

As illustrated, borehole 102 may extend through subterranean formation 106. As illustrated in FIG. 1, borehole 102 may extend generally vertically into the subterranean formation 106, however borehole 102 may extend at an angle through subterranean formation 106, such as horizontal and slanted boreholes. For example, although FIG. 1 illustrates a vertical or low inclination angle well, high inclination angle or horizontal placement of the well and equipment may be possible. It should further be noted that while FIG. 1 generally depict land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend borehole 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse borehole 102. Drill bit 122 may be attached to a distal end of drill string 116 and may be driven, for example, either by a downhole motor and/or via rotation of drill string 116 from surface 108. Drill bit 122 may be a part of a rotary steerable system (RSS) 130 at distal end of drill string 116. In other examples, drill bit 122 may be a part of a mud motor, discussed below. RSS 130 may further include tools for real-time health assessment of a rotary steerable tool during drilling operations. As will be appreciated by those of ordinary skill in the art, RSS 130 may be a measurement-while drilling (MWD) or logging-while-drilling (LWD) system.

RSS 130 may comprise any number of tools, such as sensors, transmitters, and/or receivers to perform downhole measurement operations or to perform real-time health assessment of a rotary steerable tool during drilling operations. For example, as illustrated in FIG. 1, RSS 130 may be included on and/or with a bottom hole assembly (BHA) 134. It should be noted that BHA 134 may make up at least a part of RSS 130. Without limitation, any number of different measurement assemblies, communication assemblies, battery assemblies, and/or the like may form RSS 130 with BHA 134. Additionally, BHA 134 may form RSS 130 itself. In examples, BHA 134 may comprise one or more sensors 136. Sensors 136 may be connected to information handling system 138, discussed below, which may further control the operation of sensors 136. Sensors 136 may include (accelerometers, magnetometers, temperature sensors, speed, position sensors, etc.). During operations, sensors 136 may process real time data originating from various sources such as diagnostics data, sensor measurements, operational data, survey measurements, sensory state, drilling operation 100 state, BHA 134 state, RSS 130 state, and/or the like. Information and/or measurements may be processed further by information handling system 138 to determine real time heal assessment of rotary steerable tool.

Without limitation, RSS 130 may be connected to and/or controlled by information handling system 138, which may be disposed on surface 108. Without limitation, information handling system 138 may be disposed downhole in RSS 130. Processing of information recorded may occur downhole and/or on surface 108. Processing occurring downhole may be transmitted to surface 108 to be recorded, observed, and/or further analyzed. Additionally, information recorded on information handling system 138 that may be disposed downhole may be stored until RSS 130 may be brought to surface 108. In examples, information handling system 138 may communicate with RSS 130 through a communication line (not illustrated) disposed in (or on) drill string 116. In examples, wireless communication may be used to transmit information back and forth between information handling system 138 and RSS 130. Information handling system 138 may transmit information to RSS 130 and may receive as well as process information recorded by RSS 130. In examples, a downhole information handling system (not illustrated) may include, without limitation, a microprocessor or other suitable circuitry, for estimating, receiving and processing signals from RSS 130. Downhole information handling system (not illustrated) may further include additional components, such as memory, input/output devices, interfaces, and the like. In examples, while not illustrated, RSS 130 may include one or more additional components, such as analog-to-digital converter, filter and amplifier, among others, which may be used to process the measurements of RSS 130 before they may be transmitted to surface 108. Alternatively, raw measurements from RSS 130 may be transmitted to surface 108.

Any suitable technique may be used for transmitting signals from RSS 130 to surface 108, including, but not limited to, wired pipe telemetry, mud-pulse telemetry, acoustic telemetry, and electromagnetic telemetry. While not illustrated, RSS 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from RSS 130 to an information handling system 138 at surface 108. Information handling system 138 may include a personal computer 141, a video display 142, a keyboard 144 (i.e., other input devices), and/or non-transitory computer-readable media 146 (e.g., optical disks, magnetic disks) that can store code representative of the methods described herein. In addition to, or in place of processing at surface 108, processing may occur downhole as information handling system 138 may be disposed on RSS 130. Likewise, information handling system 138 may process measurements taken by one or more sensors 136 automatically or send information from sensors 136 to the surface. As discussed above, the software, algorithms, and modeling are performed by information handling system 138. Information handling system 138 may perform steps, run software, perform calculations, and/or the like automatically, through automation (such as through artificial intelligence ("AI"), dynamically, in real-time, and/or substantially in real-time.

Figure 2:
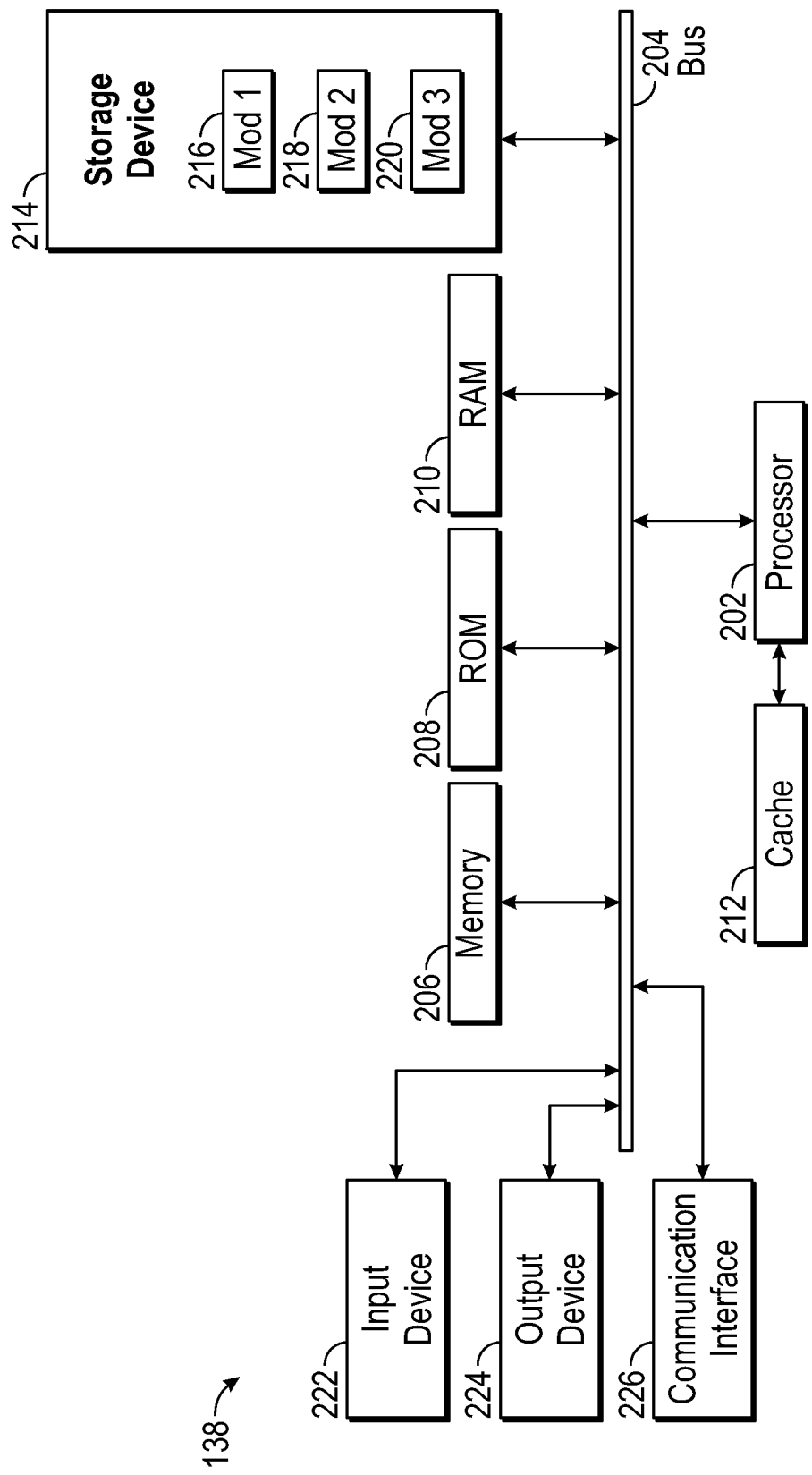
FIG. 2 illustrates an example of an information handling system.

FIG. 2 illustrates an example information handling system 138 which may be employed to perform various steps, methods, and techniques disclosed herein. Persons of ordinary skill in the art will readily appreciate that other system examples are possible. As illustrated, information handling system 138 includes a processing unit (CPU or processor) 202 and a system bus 204 that couples various system components including system memory 206 such as read only memory (ROM) 208 and random access memory (RAM) 210 to processor 202. Processors disclosed herein may all be forms of this processor 202. Information handling system 138 may include a cache 212 of high-speed memory connected directly with, in close proximity to, or integrated as part of processor 202. Information handling system 138 copies data from memory 206 and/or storage device 214 to cache 212 for quick access by processor 202. In this way, cache 212 provides a performance boost that avoids processor 202 delays while waiting for data. These and other modules may control or be configured to control processor 202 to perform various operations or actions. Other system memory 206 may be available for use as well. Memory 206 may include multiple different types of memory with different performance characteristics. It may be appreciated that the disclosure may operate on information handling system 138 with more than one processor 202 or on a group or cluster of computing devices networked together to provide greater processing capability. Processor 202 may include any general purpose processor and a hardware module or software module, such as first module 216, second module 218, and third module 220 stored in storage device 214, configured to control processor 202 as well as a special-purpose processor where software instructions are incorporated into processor 202. Processor 202 may be a self-contained computing system, containing multiple cores or processors, a bus, memory controller, cache, etc. A multi-core processor may be symmetric or asymmetric. Processor 202 may include multiple processors, such as a system having multiple, physically separate processors in different sockets, or a system having multiple processor cores on a single physical chip. Similarly, processor 202 may include multiple distributed processors located in multiple separate computing devices but working together such as via a communications network. Multiple processors or processor cores may share resources such as memory 206 or cache 212 or may operate using independent resources. Processor 202 may include one or more state machines, an application specific integrated circuit (ASIC), or a programmable gate array (PGA) including a field PGA (FPGA).

Each individual component discussed above may be coupled to system bus 204, which may connect each and every individual component to each other. System bus 204 may be any of several types of bus structures including a memory bus or memory controller, a peripheral bus, and a local bus using any of a variety of bus architectures. A basic input/output (BIOS) stored in ROM 208 or the like, may provide the basic routine that helps to transfer information between elements within information handling system 138, such as during start-up. Information handling system 138 further includes storage devices 214 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 214 may include software modules 216, 218, and 220 for controlling processor 202. Information handling system 138 may include other hardware or software modules. Storage device 214 is connected to the system bus 204 by a drive interface. The drives and the associated computer-readable storage devices provide nonvolatile storage of computer-readable instructions, data structures, program modules and other data for information handling system 138. In one aspect, a hardware module that performs a particular function includes the software component stored in a tangible computer-readable storage device in connection with the necessary hardware components, such as processor 202, system bus 204, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 138 is a small, handheld computing device, a desktop computer, or a computer server. When processor 202 executes instructions to perform "operations", processor 202 may perform the operations directly and/or facilitate, direct, or cooperate with another device or component to perform the operations.

As illustrated, information handling system 138 employs storage device 214, which may be a hard disk or other types of computer-readable storage devices which may store data that are accessible by a computer, such as magnetic cassettes, flash memory cards, digital versatile disks (DVDs), cartridges, random access memories (RAMs) 210, read only memory (ROM) 208, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 138, an input device 222 represents any number of input mechanisms, such as a microphone for speech, a touch-sensitive screen for gesture or graphical input, keyboard, mouse, motion input, speech and so forth. Additionally, input device 222 may take in data from one or more sensors 136, discussed above. An output device 224 may also be one or more of a number of output mechanisms known to those of skill in the art. In some instances, multimodal systems enable a user to provide multiple types of input to communicate with information handling system 138. Communications interface 226 generally governs and manages the user input and system output. There is no restriction on operating on any particular hardware arrangement and therefore the basic hardware depicted may easily be substituted for improved hardware or firmware arrangements as they are developed.

As illustrated, each individual component describe above is depicted and disclosed as individual functional blocks. The functions these blocks represent may be provided through the use of either shared or dedicated hardware, including, but not limited to, hardware capable of executing software and hardware, such as a processor 202, that is purpose-built to operate as an equivalent to software executing on a general purpose processor. For example, the functions of one or more processors presented in FIG. 2 may be provided by a single shared processor or multiple processors. Use of the term "processor" should not be construed to refer exclusively to hardware capable of executing software. Illustrative embodiments may include microprocessor and/or digital signal processor (DSP) hardware, read-only memory (ROM) 208 for storing software performing the operations described below, and random-access memory (RAM) 210 for storing results. Very large-scale integration (VLSI) hardware embodiments, as well as custom VLSI circuitry in combination with a general-purpose DSP circuit, may also be provided.

The logical operations of the various methods, described below, are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Information handling system 138 may practice all or part of the recited methods, may be a part of the recited systems, and/or may operate according to instructions in the recited tangible computer-readable storage devices. Such logical operations may be implemented as modules configured to control processor 202 to perform particular functions according to the programming of software modules 216, 218, and 220.

In examples, one or more parts of the example information handling system 138, up to and including the entire information handling system 138, may be virtualized. For example, a virtual processor may be a software object that executes according to a particular instruction set, even when a physical processor of the same type as the virtual processor is unavailable. A virtualization layer or a virtual "host" may enable virtualized components of one or more different computing devices or device types by translating virtualized operations to actual operations. Ultimately however, virtualized hardware of every type is implemented or executed by some underlying physical hardware. Thus, a virtualization compute layer may operate on top of a physical compute layer. The virtualization compute layer may include one or more virtual machines, an overlay network, a hypervisor, virtual switching, and any other virtualization application.

Figure 3:
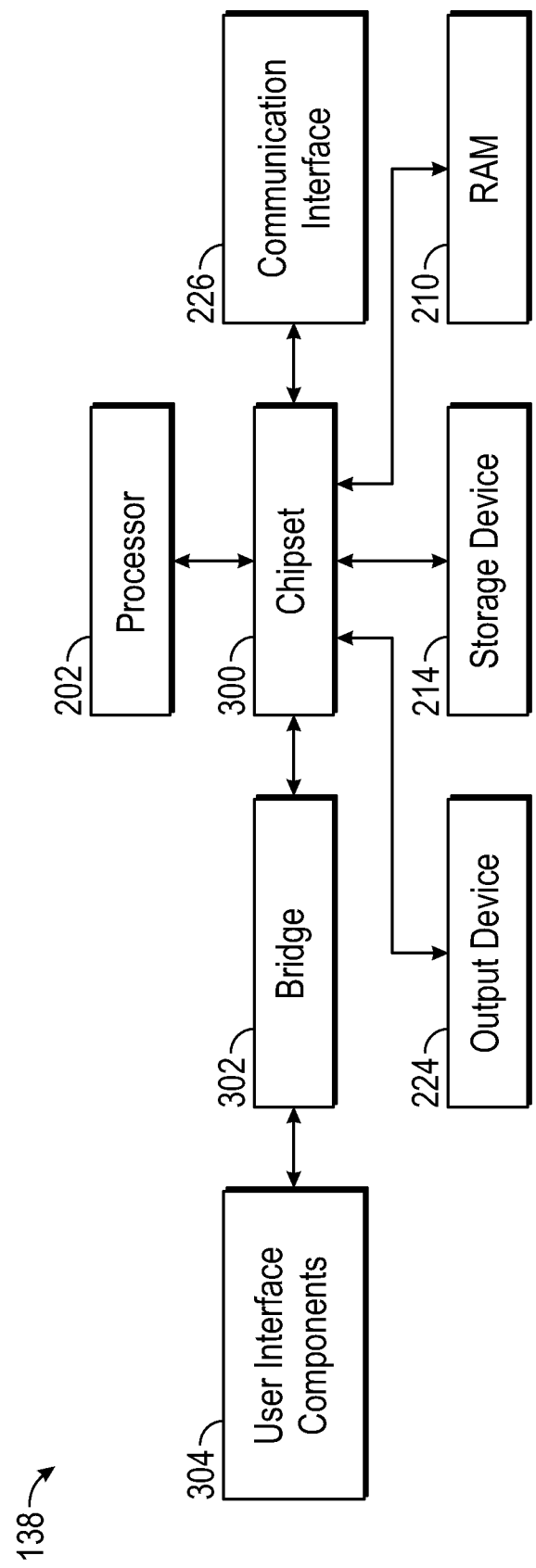
FIG. 3 illustrates an example of a chips set used in the information handling system.

FIG. 3 illustrates an example information handling system 138 having a chipset architecture that may be used in executing the described method and generating and displaying a graphical user interface (GUI). Information handling system 138 is an example of computer hardware, software, and firmware that may be used to implement the disclosed technology. Information handling system 138 may include a processor 202, representative of any number of physically and/or logically distinct resources capable of executing software, firmware, and hardware configured to perform identified computations. Processor 202 may communicate with a chipset 300 that may control input to and output from processor 202. In this example, chipset 300 outputs information to output device 224, such as a display, and may read and write information to storage device 214, which may include, for example, magnetic media, and solid-state media. Chipset 300 may also read data from and write data to RAM 210. A bridge 302 for interfacing with a variety of user interface components 304 may be provided for interfacing with chipset 300. Such user interface components 304 may include a keyboard, a microphone, touch detection and processing circuitry, a pointing device, such as a mouse, and so on. In general, inputs to information handling system 138 may come from any of a variety of sources, machine generated and/or human generated.

Chipset 300 may also interface with one or more communication interfaces 226 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 202 analyzing data stored in storage device 214 or RAM 210. Further, information handling system 138 receive inputs from a user via user interface components 304 and execute appropriate functions, such as browsing functions by interpreting these inputs using processor 202.

In examples, information handling system 138 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

FIG. 1 further illustrates a second drilling operation 150 that may be in the vicinity of drilling operation 100. Although two drilling operations are illustrated, there may be any number of drilling operations ongoing that may interfere with each other. Likewise, there may be one or more completed wells in the vicinity of active drilling operations. Second drilling operation 150 may comprise all items identified for drilling operation 100. As illustrated a second BHA 152 may operate and function in the vicinity of BHA 134. The ability of second BHA 152 and BHA 134 to identify each other within formation 106 may prevent second BHA 152 and BHA 134 from contacting each other during drilling operations. As illustrated, an electromagnetic field 154 may be emitted from BHA 134. This field may emanate from a solenoid source discussed below. Electromagnetic field 154 may be sensed by one or more receivers, discussed below, that are disposed on BHA 152.

FIG. 4A illustrates a cutaway for BHA 134 and/or second BHA 152. BHA 134 may comprise a ranging device 400 disposed in or about BHA 134 and/or BHA 152. Ranging device 400 may comprise of solenoid 402, which may be powered by one or more batteries 404, a turbine 406, and/or capacitors 410. In examples, BHA 134 and/or second BHA 152 may further comprise a secondary ranging device 408, which also comprises a solenoid 402, one or more batteries 404, a turbine 406, and/or capacitors 410. During operations, secondary ranging device 408 may be utilized if ranging device 400 fails or may be utilized with ranging device 400. Both ranging device 400 and secondary ranging device 408 may be utilized to identify and range between a plurality of BHAs and completed wells. To perform ranging operations between BHAs, one or more receivers may be used on each BHA.

FIG. 4B illustrates one or more receivers 412 disposed at different locations within and/or along BHA 134 and/or second BHA 152. In examples, receiver 412 may be a single, a dual, and/or a triaxial magnetometers. In examples, receiver 412 may automatically increase in scale or decrease in scale based on a scaling resolution sought for measurements. Generally, the scaling resolution may increase as the source strength increases as proximity decreases between receiver 412 and ranging device 400. Scaling resolution may decrease as the source strength decreases and as proximity increases between receiver 412 and ranging device 400. Receivers 412 may be disposed on an RSS 130, drill bit 122, MWD/LWD subs 414, mud motor 416, and/or collars 418 that connect one or more subs and/or devices of BHA 134 and/or second BHA 152. Receivers may operate and function to receive either an AC or DC based signal emanating from ranging device 400. During ranging operations, receivers 412 may measure the electromagnetic field emanating from solenoid 402 by measuring the amplitude between the peaks of the polarity switch of solenoid 402. These measurements may be sent to information handling system 138, which may then compare the measurements collected downhole to a previously collected downhole measurements (i.e., stored in a database) and known decay rate in the magnetic field emitted from solenoid 402. From this dataset, a calculation of the relative distance from solenoid 402 and from the three components of the field the direction to the center of the magnetic source, to receiver 412 may be determined.

Figure 5A:
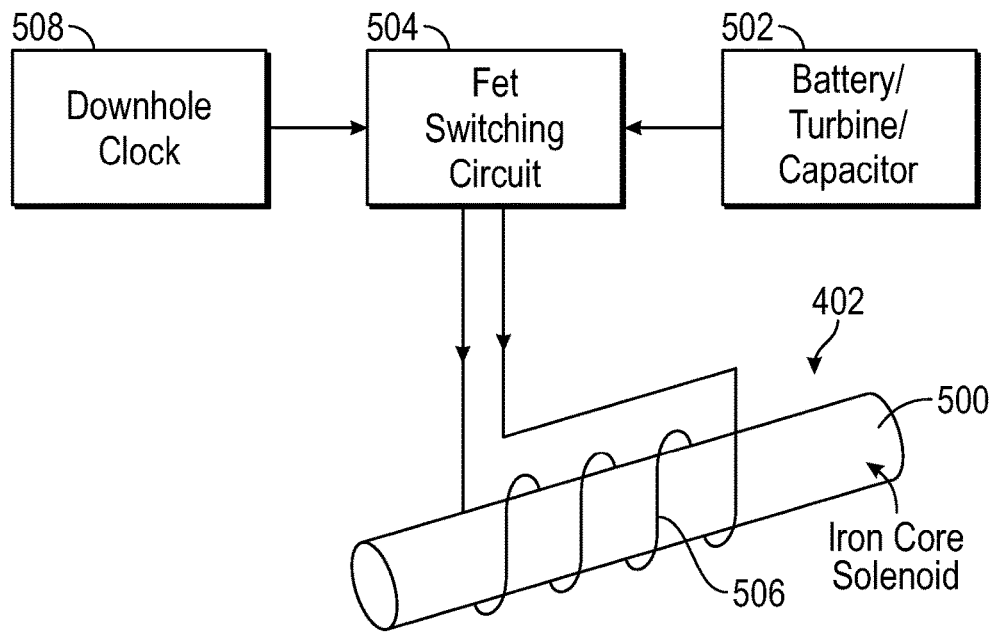
FIGS. 5A-5C illustrate different examples of one or more windings disposed around a solenoid.
Figure 5B:
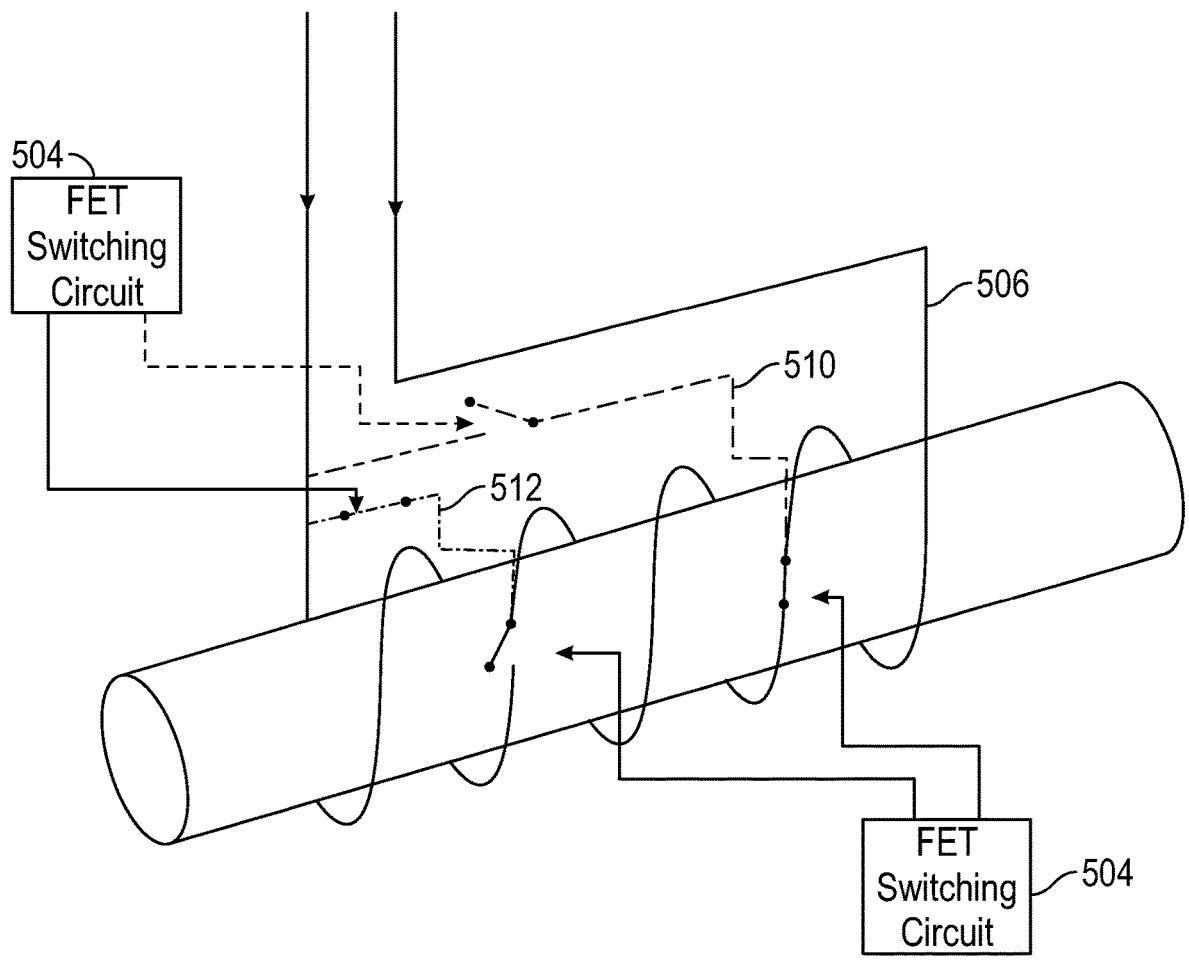
Figure 5C:
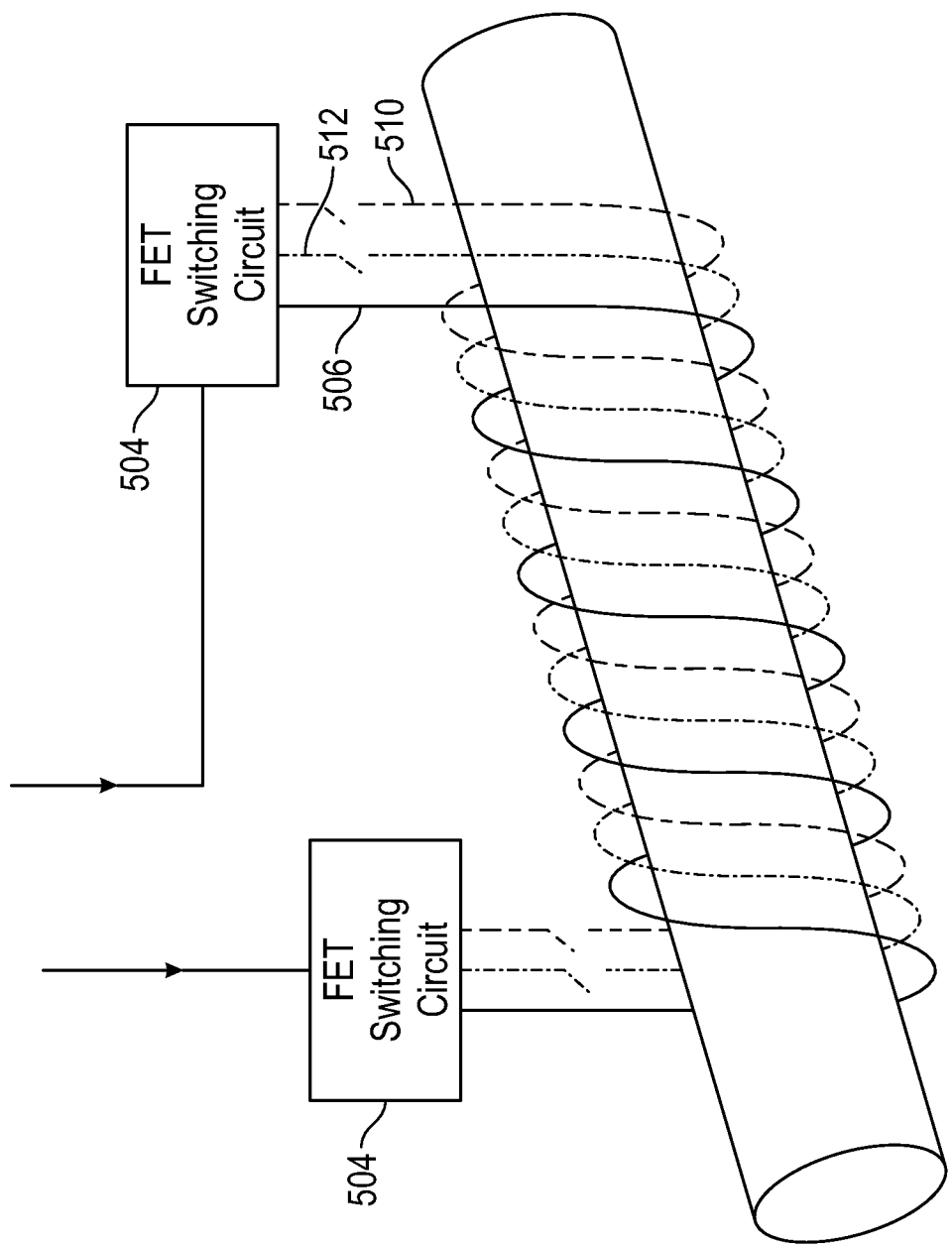

FIG. 5A illustrates solenoid 402, which may be disposed in BHA 134 (e.g., referring to FIG. 1), used in ranging device 400. Solenoid 402 may comprise a laminated core 500 that may be of variable length with a length not less than one meter. To provide the desired magnetic field, this solenoid may utilize a sufficient power output to magnetically saturate the iron core, for example, and this is supplied by downhole power supply 502 connected to a polarity reversing FET (field effect transistor) switching circuit 504 connected across solenoid winding 506. Additionally, FET switching circuit 504 may be further controlled by downhole clock 508, which may further help in the creating of a desired magnetic field. Downhole power supply 502 may be a battery, a turbine, a capacitor, and/or the like and any combination thereof. In examples, the number of solenoid windings 506 around core 500 increase an electromagnetic field 154 emitted (e.g., referring to FIG. 1) from ranging device 400. Solenoid 402 may contain multiple layers of solenoid winding 506 such that the magnetic field may be varied from each independent ranging device 400. This may be accomplished by adding layers of solenoid winding 506 and therefore turns per unit length and/or overall length of solenoid 402 that is being utilized at any given point in time. Additionally, information handling system 138 may select one or multiple layers to be energized at any given time utilizing one or more FET switching circuits 504. For examples, as illustrated in FIG. 5B, one or more FET switching circuits 504 may control current flow through solenoid windings 506, a second solenoid winding 510, and/or a third solenoid winding 512. Each additional winding may represent a new layer that may be above and/or below another layer. FIG. 5C illustrates another example of solenoid windings 506, a second solenoid winding 510, and/or a third solenoid winding 512 in which FET switching circuits 504 control current through each layer. Likewise, the direction of electric current flow applied through each solenoid winding 506 layer may be controlled by information handling system 138. For example, a user may adjust the amperage through each solenoid winding 506 layer and/or the number of layers energized to control the magnitude of the electromagnetic field formed by ranging device 400.

During operations, receiver 412, discussed above and below, may be controlled by information handling system 138 to sense electromagnetic field 154 generated by ranging device 400. Generally, first BHA 134 may transmit electromagnetic field 154, which may be sensed and/or measured by one or more receivers 412 on BHA 152, or vice verso. As energy is scarce in a downhole environment, the field strength sensed or gradient of field strength across receiver 412 measured may be controlled by a user at surface using information handling system 138. For example, if ranging device 400 is generating an electromagnetic field 154 and it is no sensed by one or more receivers 412 on the opposed BHA, then the user may increase electromagnetic field 154. This may be done, as discussed above by increasing the amperage moving through a solenoid winding 506 layer or increasing the number of solenoid winding 506 layers that may be utilized. Therefore, electromagnetic field 154 may increase in size and strength until sensed by at least one receiver 412 on the opposite BHA. As both BHAs move closer together, amperage and the number of solenoid winding 506 layers may be reduced. This prevents receivers 412 from being saturated by electromagnetic field 154 and may allow for a user to determine distance and direction between the BHAs. Saturation of receivers 412 may be reviewed by a user utilizing information handling system 138.

Figure 6:
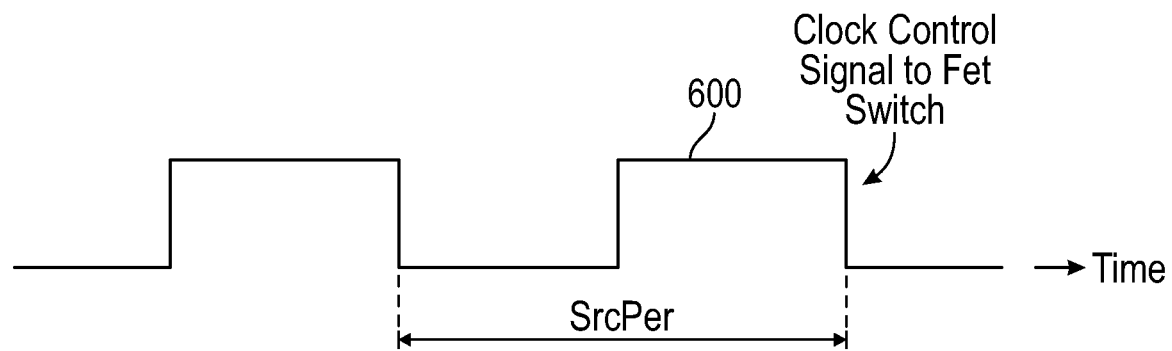
FIG. 6 is a graph of the transmission of the ranging device.
Figure 7:
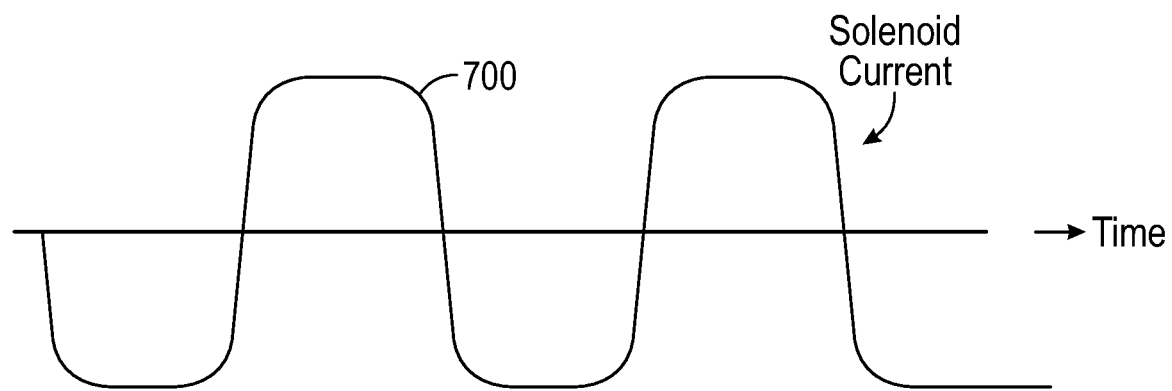
FIG. 7 is a graph of solenoid current vs. time waveform.

FIG. 6 illustrates that electric current flow may be periodically reversed by a reference square wave with a precise cycle period of between 1 and 100 cycles per second derived from clock signals 600, generated by a crystal oscillator having a frequency that is precise to a few parts per million. The solenoid current vs. time waveform illustrated at 700 in FIG. 7 produces a magnetic dipole field of alternating polarity. Although the principles of physics-governing the behavior of the magnetic fields used in the analysis to be described are those appropriate to time independent magnetic fields, it is desirable to repeatedly reverse the direction of current flow in the solenoid to allow precise separation of the solenoid field from the Earth's magnetic field and from instrumental and magnetic field noise. It is also possible to simply turn the solenoid current on and off and to record the field differences. In this case the amplitude of the alternating polarity component of the magnetic dipole and field produced will be one half that produced if the current is reversed.

Figure 8:
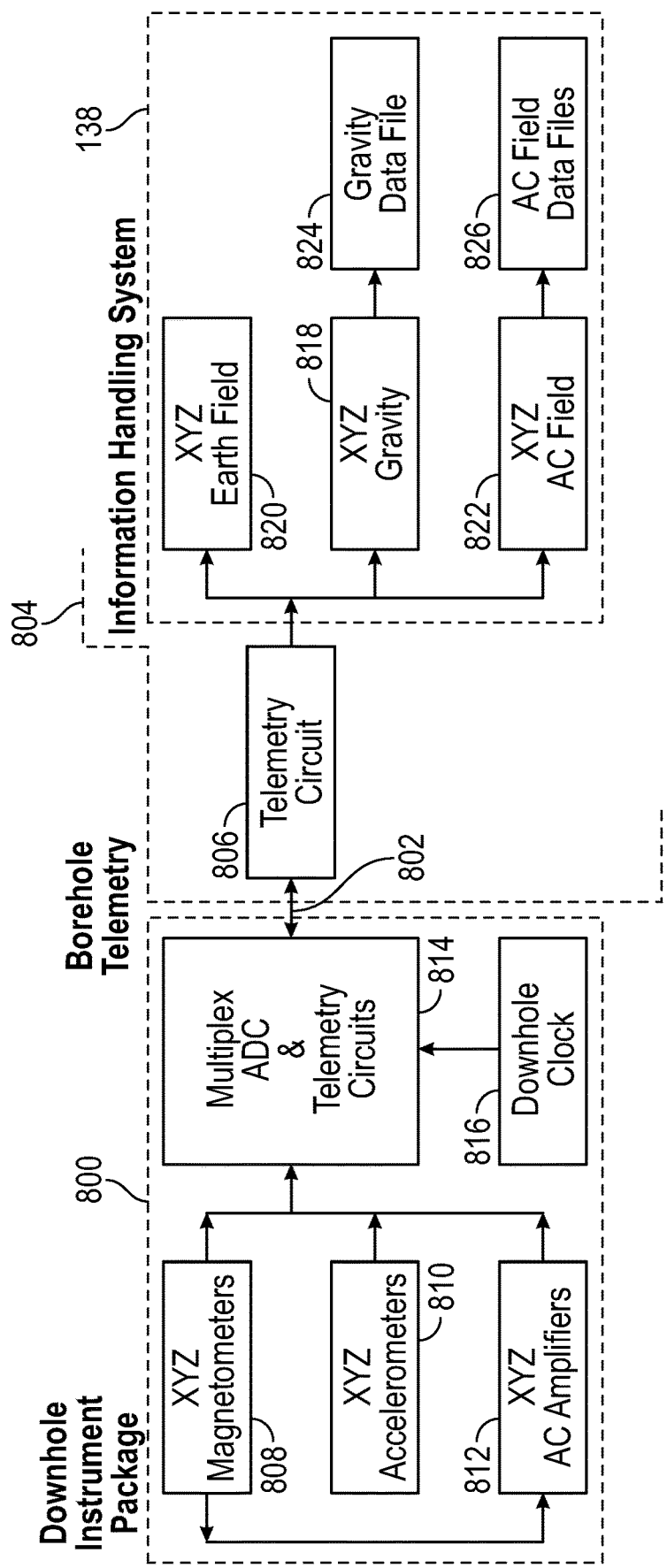
FIG. 8 illustrates configuration of one or more components to power and operate the ranging device.

A schematic diagram of the downhole measuring apparatus 800 is shown in FIG. 8 as being connected via a borehole telemetry link 802 to an uphole drilling control room 804 within drilling operations 100 on Earth's surface 108 (e.g., referring to FIG. 1). Control room 804 has information handling system 138 for processing the data received from the downhole electronics and a controller for operating drilling operations.

Downhole instrument package 800 may comprise a three-vector component magnetometer 808 and a three-vector component accelerometer 810, each of which generates output signals with respect to an xyz set of axes. The z axis of downhole instrument package 800 is aligned with borehole 102 being drilled, and the perpendicular x and y axes have a known orientation alignment to the drill face; i.e., to the direction of a bent housing in the drilling motor which controls the direction of drilling. The magnetometer AC outputs are passed through band pass amplifiers 812 and are multiplexed with the magnetometer DC outputs and the accelerometer outputs at multiplexer 814, where the signals are converted from analog to digital form and finally put into a form suitable for telemetry to the surface. The timing for digitization and telemetry is generated by a downhole clock 816 controlled by a quartz crystal whose frequency is precise to a few parts per million.

During drilling operations, drilling may be halted from time to time at a measurement station along the proposed borehole path, to perform a ranging measurement utilizing ranging device 400. The resulting reversing field with an alternating polarity component is detected by magnetometers contained with 412 and/or 800, the resulting output signals are transmitted uphole, a few minutes of data are recorded, and a data file is generated. During each set of measurement operations, the downhole multiplexer circuitry 814 sequentially samples the output voltages of magnetometers 808 and accelerometers 810 at fixed time intervals and telemeters the results to information handling system 138 at surface 108, which separates the gravity measurements at 818 from the Earth's field measurements at 820 and the AC field measurements at 822. Results are sent through a telemetry circuit 806, that may connect information handling system 138 to downhole instrument package 800. The relative time at which each measurement is made is precisely preserved by the position it has in the serial data stream being telemetered, and the gravity data and AC field data are stored at data files 824 and 826, respectively. Information handling system 138 generates from the gravity data a single row, three column matrix gxyz with elements gx, gy and gz, which are the representation of the measured gravity g in the xyz coordinate system. From the magnetometer measurement data, two 3-column matrices h1 and h2 are generated. The first matrix h1 has three columns h1x, h1y, and h1z which are tabulations of the time sequence of the digitized magnetometer measurement data from the first orientation of the solenoid. The second matrix h2 has three columns h2x, h2y, and h2z which are tabulations of the time sequence of magnetic field measurements from the second orientation of the solenoid.

In other examples, magnetometers 808 or gradiometers (magnetometer arrays) may be used to detect signal from ranging device 400 as receiver 412. Magnetometers 412/808 may be placed anywhere along BHA 134. For example, magnetometers 808 may be disposed within, on, or about bit subs, RSS 130, in drill bit 122, dumb iron such as collars or subs, and/or integrated into MWD/LWD tools.

Magnetometers 808 may have a minimum single axis capability and may be disposed along drill string 116. Magnetometers 808 may be utilized for ranging measurements. Ranging measurements may not be tied to survey measurements but may be used to correct survey measurements and to correct borehole azimuth relative to reference borehole ranging data.

Before drilling operations, solenoid 402 may be degaussed before installation to remove or reduce remnant magnetic field along core affecting other magnetometer readings. Solenoid 402 may be positioned at any suitable location along or within one or more BHAs 134, within an RSS, mud motor, MWD/LWD components, and/or above or below any of the locations listed. Multiple solenoids, which may have similar or varying size may be positioned within the BHA 134. This may allow personnel to optionality select which solenoid is utilized at any time during drilling operations. As noted above, one or more BHAs 134 may be used as both, or individually, a ranging device 400 and receiver 412. For examples, one or more BHAs 134 may have a solenoid 402 installed on any of the BHAs 134 for transmission.

Downhole operations may also include a pair or acoustic/sonic measurement tools with one tool acting as the transmitter and a second tool acting as a receiver. This may also be accomplished through utilizing a pair of long-range induction-based resistivity measurement tools which may co-locate each other through transmission and receiving of frequency and phase firing from the resistivity tool.

Improvements over current technology are seen in a smoother operation and lower overall cost of ownership to complete magnetic ranging determinations. The key improvements this system bring over existing technology is to remove the need for dedicated wireline conveyance of either a ranging source or receiver into one or multiple bottom hole assemblies. This proposed solution significantly reduces the overall cost of ownership of drilling simultaneous boreholes in close proximity where collision needs to be avoided or where an intersection is desired as dictated by the borehole geometry and objectives. The methods and systems may include any of the various features disclosed herein, including one or more of the following statements.

Statement 1: A method may comprise transmitting an electromagnetic field from a ranging device disposed on a first bottom hole assembly (BHA), measuring the electromagnetic field with a receiver disposed on a second BHA to form a measurement set, comparing the measurement set to a decay rate of the electromagnetic field, and identifying a distance between the ranging device and the receiver based at least in part on the decay rate.

Statement 2. The method of statement 1, wherein the ranging device is a solenoid.

Statement 3. The method of statement 2, wherein a number of solenoid windings are disposed over the solenoid.

Statement 4. The method of statement 3, wherein the number of solenoid windings is directly connected to a strength of the electromagnetic field.

Statement 5. The method of statement 2, wherein a current is pumped through the number of solenoid windings in a first direction to form the electromagnetic field.

Statement 6. The method of statement 5, wherein the current is pumped through the number of solenoid windings in a second direction opposite the first direction to form a second magnetic field.

Statement 7. The method of statement 2, wherein the solenoid is powered by one or more batteries, a turbine, or a capacitor.

Statement 8. The method of statements 1 or 2, wherein the receiver is a single, dual, or triaxial magnetometer that is configured to automatically increase or decrease a scaling resolution.

Statement 9. The method of statements 1, 2, or 8, wherein the second BHA comprises a single or plurality of receivers.

Statement 10. The method of statements 1, 2, 8, or 9, further comprising adjusting a path of the first BHA with a first rotary steerable system (RSS) connected to the first BHA based at least in part on the distance between the ranging device and the receiver.

Statement 11. A system may comprise a first bottom hole assembly (BHA) comprising a ranging device that transmits an electromagnetic field, and a second BHA comprising a receiver that measures the electromagnetic field to form a measurement set. The system may further comprise an information handling system that compares the measurement set to a decay rate of the electromagnetic field, and identifies a distance between the ranging device and the receiver based at least in part on the decay rate.

Statement 12. The system of statement 11, wherein the ranging device is a solenoid.

Statement 13. The system of statement 12, further comprising a number of solenoid windings disposed over the solenoid.

Statement 14. The system of statement 13, wherein the number of solenoid windings is directly connected to a strength of the electromagnetic field.

Statement 15. The system of statement 12, wherein a current is pumped through the number of solenoid windings in a first direction to form the electromagnetic field.

Statement 16. The system of statement 15, wherein the current is pumped through the number of solenoid windings in a second direction opposite the first direction to form a second magnetic field.

Statement 17. The system of statement 12, further comprising one or more batteries, a turbine, or a capacitor that powers the solenoid.

Statement 18. The system of statements 11 or 12, wherein the receiver is a triaxial magnetometer.

Statement 19. The system of statements 11, 12, or 18, wherein the second BHA comprises a plurality of receivers.

Statement 20. The system of statements 11, 12, 18, or 20, further comprising a first rotary steerable system (RSS) connected to the first BHA and altering a path of the first RSS based at least in part on the distance between the ranging device and the receiver.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
    transmitting an electromagnetic field from a ranging device disposed on a first bottom hole assembly (BHA), the ranging device including a solenoid and a plurality of separately activatable winding layers disposed over the solenoid, wherein the ranging device is configured to modify the electromagnetic field from a first magnitude to a second magnitude by selectively and separately switching the plurality of separately activatable winding layers on and off;
    measuring the electromagnetic field with a receiver disposed on a second BHA to form a measurement set;
    comparing the measurement set to a decay rate of the electromagnetic field; and
    identifying a direction or a distance between the ranging device and the receiver.

2. The method of claim 1, wherein a current flows through the plurality of separately activatable winding layers in a first direction to form the electromagnetic field.

3. The method of claim 2, wherein the current flow through the plurality of separately activatable solenoid winding layers in a second direction opposite the first direction to form a second magnetic field.

4. The method of claim 1, wherein the solenoid is powered by one or more batteries, a turbine, or a capacitor.

5. The method of claim 1, wherein the receiver is a single, dual, or triaxial magnetometer that is configured to automatically increase or decrease a scaling resolution.

6. The method of claim 1, further comprising transmitting a secondary electromagnetic field from a second ranging device disposed on the first BHA.

7. The method of claim 1, further comprising adjusting a path of the first BHA with a first rotary steerable system (RSS) connected to the first BHA based at least in part on the distance between the ranging device and the receiver.

8. A system comprising:
    a first bottom hole assembly (BHA) comprising a ranging device with a plurality of separately activatable winding layers that transmits an electromagnetic field, wherein the ranging device is configured to modify an electromagnetic field from a first magnitude to a second magnitude by selectively and separately switching the plurality of separately activatable winding layers on and off;
    a second BHA comprising a receiver that measures the electromagnetic field to form a measurement set;
    an information handling system that:
        compares the measurement set to a decay rate of the electromagnetic field; and
        identifies a distance or a direction between the ranging device and the receiver.

9. The system of claim 8, wherein the ranging device is a solenoid.

10. The system of claim 9, wherein the number of the plurality of separately activatable winding layers that is activated determines a variable strength of the electromagnetic field.

11. The system of claim 9, wherein a current flows through the plurality of separately activatable winding layers in a first direction to form the electromagnetic field.

12. The system of claim 11, wherein the current flows through the plurality of separately activatable winding layers in a second direction opposite the first direction to form a second magnetic field.

13. The system of claim 9, further comprising one or more batteries, a turbine, or a capacitor that powers the solenoid.

14. The system of claim 8, wherein the receiver is a triaxial magnetometer.

15. The system of claim 8, further comprising a second ranging device disposed on the first BHA that transmits a secondary electromagnetic field.

16. The system of claim 8, further comprising a first rotary steerable system (RSS) connected to the first BHA and altering a path of the first RSS based at least in part on the distance between the ranging device and the receiver.

* * * * *